US012477260B2

(12) United States Patent
Miyata et al.

(10) Patent No.: US 12,477,260 B2
(45) Date of Patent: Nov. 18, 2025

(54) ELECTRICAL DEVICE

(71) Applicants: DENSO ELECTRONICS CORPORATION, Anjo (JP); FOSTER ELECTRIC COMPANY, LIMITED, Tokyo (JP)

(72) Inventors: Susumu Miyata, Anjo (JP); Atsushi Koga, Akishima (JP)

(73) Assignees: DENSO ELECTRONICS CORPORATION, Anjo (JP); FOSTER ELECTRIC COMPANY, LIMITED, Tokyo (JP)

( * ) Notice: Subject to any disclaimer, the term of this patent is extended or adjusted under 35 U.S.C. 154(b) by 271 days.

(21) Appl. No.: 18/462,836

(22) Filed: Sep. 7, 2023

(65) Prior Publication Data

US 2023/0421938 A1 Dec. 28, 2023

Related U.S. Application Data

(63) Continuation of application No. PCT/JP2022/005570, filed on Feb. 14, 2022.

(30) Foreign Application Priority Data

Mar. 12, 2021 (JP) ................................ 2021-040449

(51) Int. Cl.
*H04R 1/06* (2006.01)
*H04R 1/02* (2006.01)
*H04R 3/00* (2006.01)

(52) U.S. Cl.
CPC ............... *H04R 1/06* (2013.01); *H04R 1/025* (2013.01); *H04R 3/00* (2013.01); *H04R 2400/11* (2013.01); *H04R 2499/13* (2013.01)

(58) Field of Classification Search
CPC ........ H04R 1/06; H04R 1/2811; H04R 1/023; H04R 1/021; H04R 1/025
See application file for complete search history.

(56) References Cited

U.S. PATENT DOCUMENTS

2018/0262824 A1 9/2018 Miyata et al.
2019/0313192 A1 10/2019 Miyata et al.

FOREIGN PATENT DOCUMENTS

JP H09327083 A 12/1997
JP 2013239881 A 11/2013
JP 2017050863 A 3/2017
JP 2018121249 A 8/2018
JP 2020156080 A 9/2020

*Primary Examiner* — Disler Paul
(74) *Attorney, Agent, or Firm* — Harness, Dickey & Pierce, P.L.C.

(57) ABSTRACT

An electrical device includes a housing, a drive unit arranged inside the housing a substrate arranged inside the housing, and a terminal electrically connecting the substrate with an external portion outside the housing. On the substrate, a circuit driving the drive unit is formed. The terminal includes a terminal protrusion exposed from an inner wall surface of the housing and protruding toward the substrate. The terminal is connected to the substrate at an end portion of the terminal protrusion. The substrate is fixed inside the housing by a first substrate attachment portion and a second substrate attachment portion arranged at a position farther from a connecting portion between the terminal and the substrate than the first substrate attachment portion. The second substrate attachment portion has higher flexibility than the first substrate attachment portion.

7 Claims, 7 Drawing Sheets

ELECTRICAL DEVICE

CROSS REFERENCE TO RELATED APPLICATIONS

The present application is a continuation application of International Patent Application No. PCT/JP2022/005570 filed on Feb. 14, 2022, which designated the U.S. and claims the benefit of priority from Japanese Patent Application No. 2021-040449 filed on Mar. 12, 2021. The entire disclosures of all of the above applications are incorporated herein by reference.

TECHNICAL FIELD

The present disclosure relates to an electrical device.

BACKGROUND

As a vehicle sound generator is used for a vehicle alarm. In the vehicle sound generator, a sound is generated by applying an electric current to a voice coil and vibrating a diaphragm connected to the voice coil.

SUMMARY

According to at least one embodiment, an electrical device includes a housing, a drive unit arranged inside the housing a substrate arranged inside the housing, and a terminal electrically connecting the substrate with an external portion outside the housing. On the substrate, a circuit configured to drive the drive unit is formed. The terminal includes a terminal protrusion exposed from an inner wall surface of the housing and protruding toward the substrate. The terminal is connected to the substrate at an end portion of the terminal protrusion.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1A:
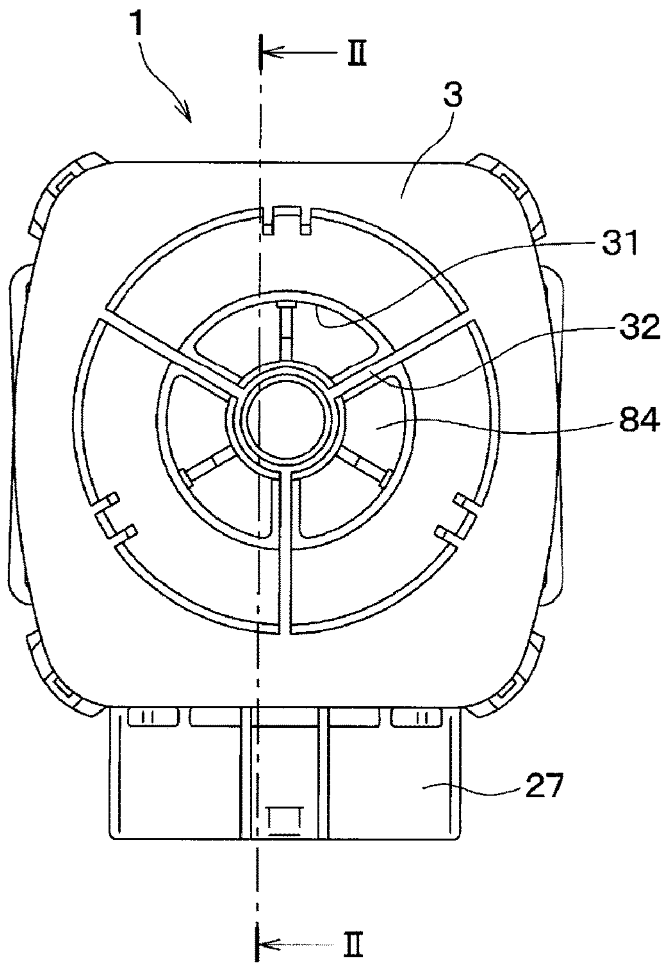
FIG. 1A is a front view of a sound generator according to a first embodiment.

To begin with, examples of relevant techniques will be described.

As a vehicle sound generator used for a vehicle alarm, a vehicle approach notification device, and the like. In the vehicle sound generator, a sound is generated by applying an electric current to a voice coil and vibrating a diaphragm connected to the voice coil. The voice coil is electrically connected to an external harness via a metal fitting of a sounding body and a terminal of the connector. In a comparative example, a metal fitting of a sounding body is press-fitted into a terminal to connect the metal fitting and the terminal.

In the comparative example, there is also a configuration in which a sounding body and a substrate on which a circuit for driving the sounding body is formed are arranged inside a casing. In this case, the terminal and a terminal metal are connected via the circuit on the substrate.

Since a vehicle sound generator is mounted in an engine room of a vehicle, the vehicle sound generator is exposed to a temperature environment from a low temperature to a high temperature. A component used in such an environment is subjected to stress of expansion and contraction due to a temperature change, and there is a possibility that a malfunction may occur.

For example, in a sound generator in which a substrate is arranged inside a casing, a crack may occur in a soldered portion connecting a terminal with the substrate, and a conduction failure may occur. Further, in a sound generator having a configuration in which a terminal and a terminal metal are directly connected to each other, the terminal metal may be detached from the terminal.

In order to avoid such a malfunction, there is a method of connecting a terminal to a substrate or a terminal metal using a highly flexible wire. However, in such a method, the number of components such as wires and connectors is increased, and an assembly process of the components is also required, so that manufacturing cost of a sound generator is increased.

Also in an electrical device other than a sound generator, in a configuration in which a terminal and another member having low flexibility are connected to each other inside a casing, there is a possibility that a malfunction similarly may occur due to a temperature change, and if a wire is used to avoid this, manufacturing cost may increase.

According to one aspect of the present disclosure, an electrical device includes a housing, a drive unit arranged inside the housing a substrate arranged inside the housing, and a terminal electrically connecting the substrate with an external portion outside the housing. On the substrate, a circuit configured to drive the drive unit is formed. The terminal includes a terminal protrusion exposed from an inner wall surface of the housing and protruding toward the substrate. The terminal is connected to the substrate at an end portion of the terminal protrusion.

As described above, the terminal protrudes from the inner wall surface of the housing and is connected to the substrate at the end portion of the terminal protrusion, so that a distance from a base of the terminal to the connecting portion with the substrate is increased. Thus, the terminal is flexibly deformed following a temperature change, and stress applied to the connecting portion between the terminal and the substrate is reduced. Therefore, the terminal and the substrate are connected to each other without using a wire or the like while reducing manufacturing cost. Thus, an occurrence of malfunction can be reduced.

Hereinafter, embodiments for implementing the present disclosure will be described referring to drawings. In each embodiment, the same reference numerals may be given to parts corresponding to matters described in a preceding embodiment, and overlapping explanations may be omitted. When only a part of the configuration is described in each embodiment, the previously described other embodiments can be applied to other parts of the configuration. A combination of parts is possible when it is explicitly stated that the combination is possible in each embodiment. A partial combination of the embodiments is also possible even if it is not explicitly stated that the partial combination is possible, unless there is a particular problem with the partial combination.

Hereinafter, embodiments of the present disclosure will be described with reference to the drawings. In the following embodiments, the same reference numerals are assigned to portions that are the same or equivalent to each other for description.

First Embodiment

A first embodiment is described below. A sound generator of the present embodiment illustrated in FIGS. 1 to 5 is installed, for example, outside a vehicle compartment of a vehicle and is used to generate an alarm sound.

Figure 1B:
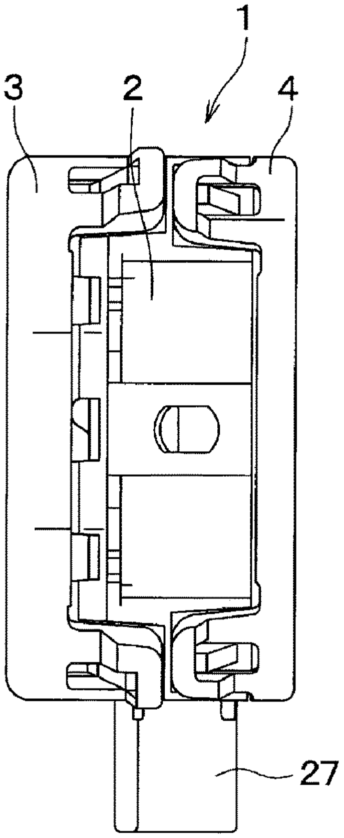
FIG. 1B is a right view of the sound generator.
Figure 1C:
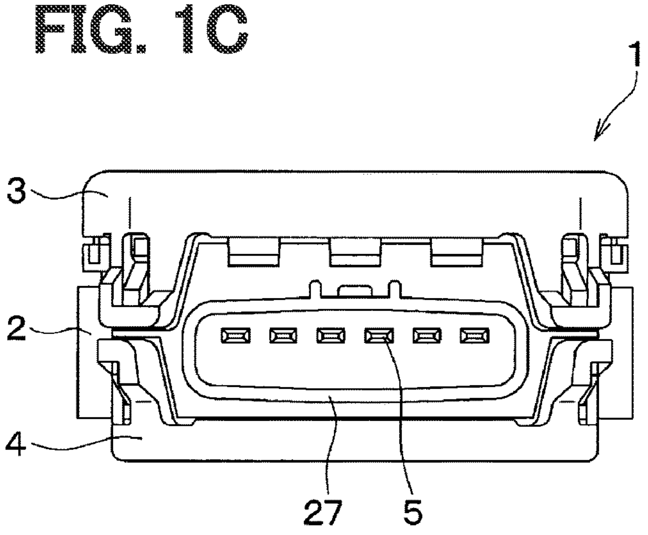
FIG. 1C is a bottom view of the sound generator.
Figure 2:
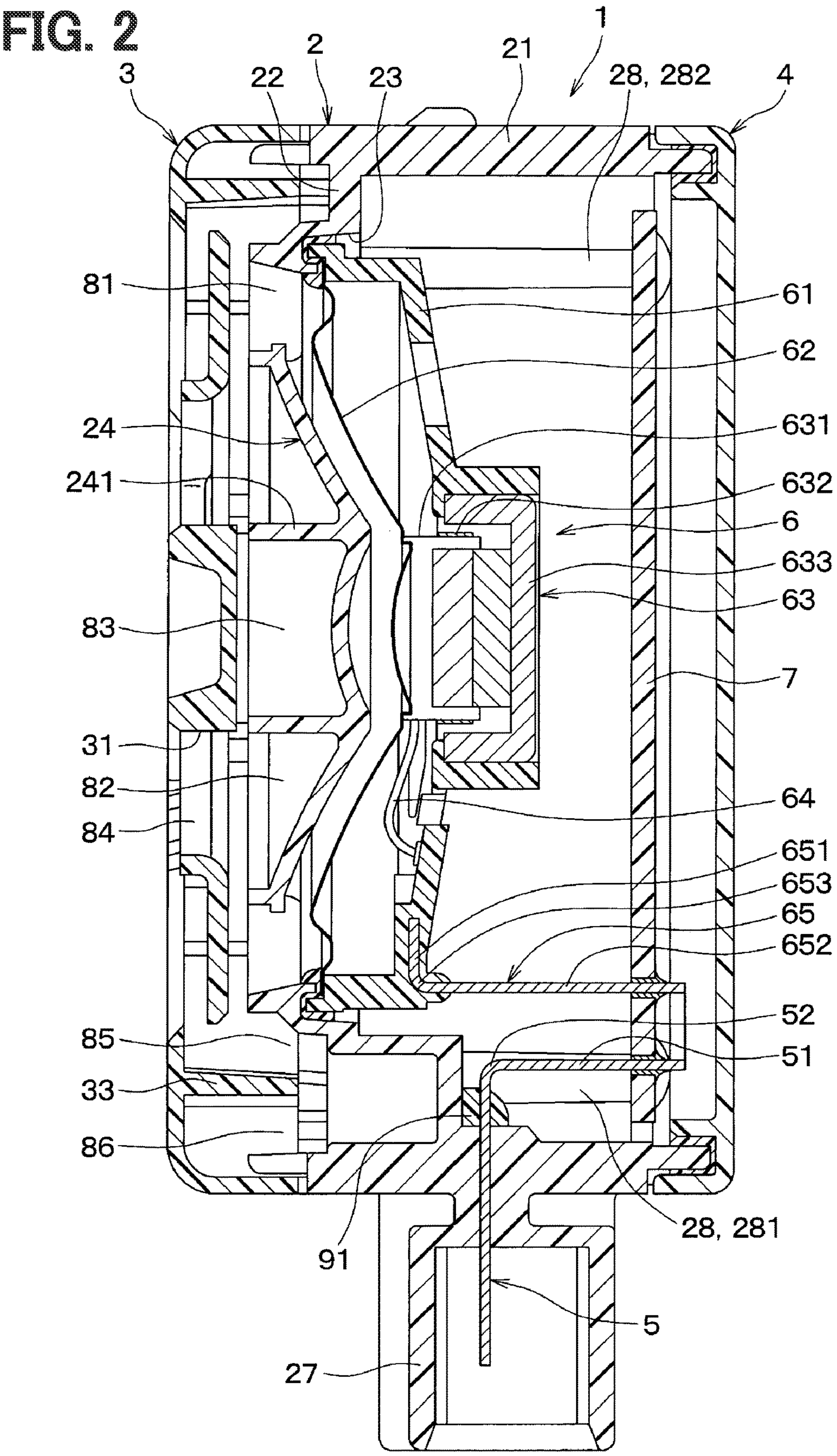
FIG. 2 is a cross-sectional view taken along a line II-II of FIG. 1 (*a*).

As shown in FIGS. 1 and 2, the sound generator includes a housing 1 in which a space is formed. The housing 1 is made of resin and includes a base 2, a cover 3, and a case 4. Further, the sound generator includes a terminal 5, and a sounding body 6 and a substrate 7 arranged inside the housing 1.

As shown in FIG. 2, the base 2 includes a base cylindrical portion 21 having a substantially rectangular cylindrical shape. The cover 3 and the case 4 have a plate shape. The cover 3 covering an opening is fitted into the opening on one end of the base cylindrical portion 21. The case 4 is hermetically joined to an opening on the other end of the base cylindrical portion 21 by adhesion.

A space in the base cylindrical portion 21 is divided into two parts, that is, a front surface side and a rear surface side, by a partition wall 22 provided in the base cylindrical portion 21. That is, the inside of the housing 1 is divided into a space defined by the base cylindrical portion 21, the partition wall 22, and the cover 3, and a space defined by the base cylindrical portion 21, the partition wall 22, and the case 4.

A circular through hole 23 is formed in the partition wall 22. The through hole 23 is closed by the sounding body 6. More specifically, the partition wall 22 has a protrusion that protrudes from a peripheral edge of the through hole 23 toward the cover 3. A tip portion of the protrusion is folded inward, and a frame 61, which will be described later, is fitted into a concave portion formed by this.

A shielding plate 24 is arranged facing a front of the sounding body 6. The shielding plate 24 reduces water or the like adhering to a surface of the cover 3 from reaching the sounding body 6 and prevents breakage of the sounding body 6 due to the adhesion of water or the like. The shielding plate 24 has an outer peripheral portion and an inner peripheral portion. The outer peripheral portion has a hollow truncated cone shape extending in a front direction. The inner peripheral portion has a dome shape protruding toward in the front direction. The shielding plate 24 is connected to the partition wall 22 by a beam member (not shown).

A sound generated by the sounding body 6 travels to an outside of the housing 1 through a space between the protrusion of the partition wall 22 and the shielding plate 24. A passage of sound formed by the partition wall 22 and the shielding plate 24 is referred to as a sound passage 81.

The shielding plate 24 has a configuration for amplifying a sound pressure of a sound having passed through the sound passage 81. More specifically, the shielding plate 24 has a cylindrical portion 241 protruding from an outline of the inner peripheral portion toward the cover 3. The outer peripheral portion of the shielding plate 24, the cylindrical portion 241, and the cover 3 define a resonance chamber 82. The inner peripheral portion of the shielding plate 24, the cylindrical portion 241, and the cover 3 define a resonance chamber 83.

Figure 3:
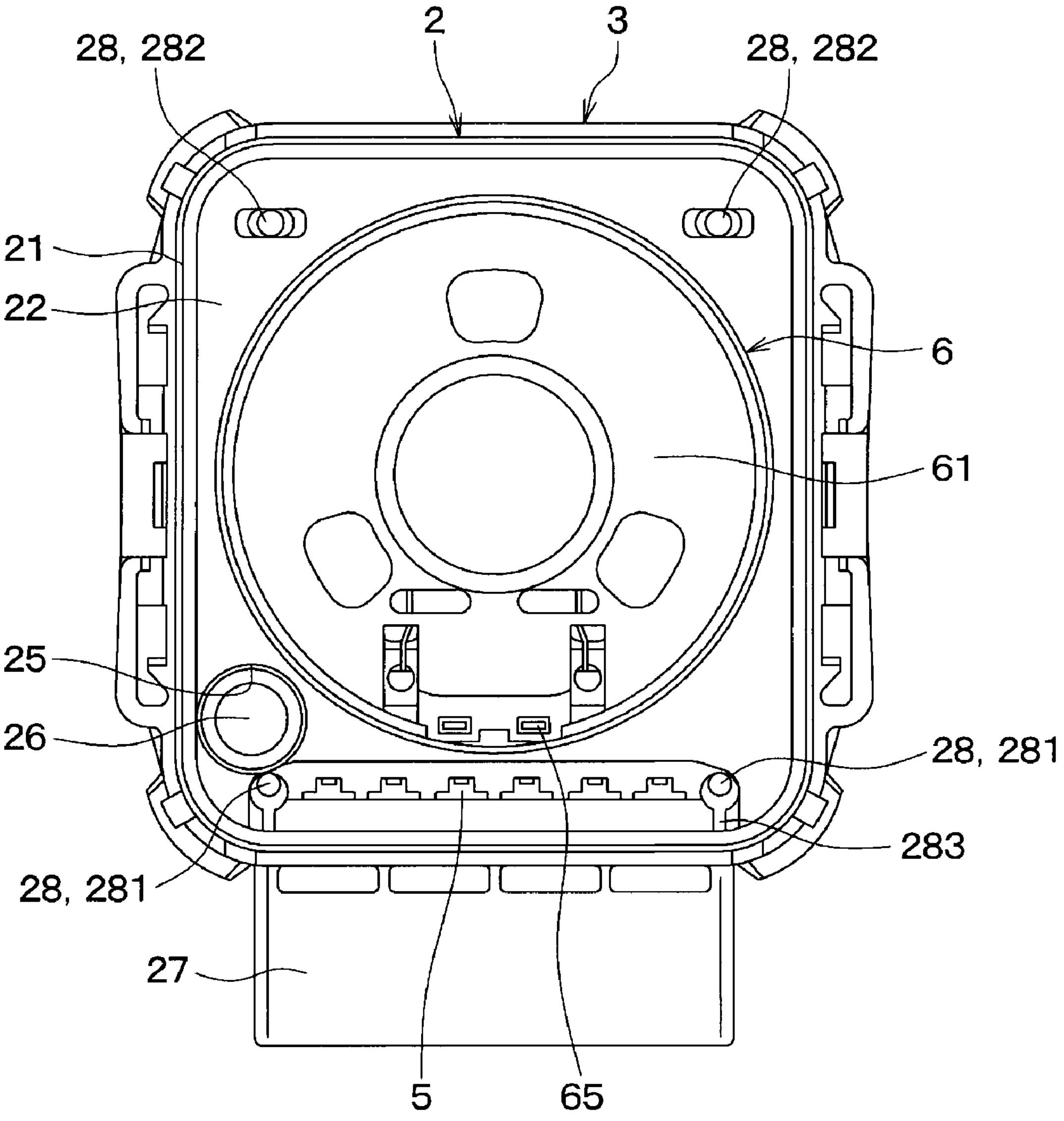
FIG. 3 is a back view of the sound generator before a substrate is attached.

As shown in FIG. 3, in the partition wall 22, a vent hole 25 is formed at a place away from the through hole 23 and the sounding body 6. The vent hole 25 is provided to reduce an occurrence of a pressure difference due to a temperature change between a space defined by the base cylindrical portion 21, the partition wall 22, and the cover 3 and a space defined by the base cylindrical portion 21, the partition wall 22, and the case 4. A ventilation film 26 is attached to the vent hole 25. The ventilation film 26 is configured to allow air to pass therethrough and block water.

The cover 3 has a substantially rectangular shape corresponding to the base cylindrical portion 21. As shown in FIGS. 1 and 2, a circumferential through hole 31 is formed in the inner peripheral portion of the cover 3 at a position corresponding to the outer peripheral portion of the shielding plate 24. The through hole 31 is for discharging a sound whose sound pressure is amplified by the resonance chambers 82 and 83 to the outside of the housing 1 through the sound passage 81.

As shown in FIG. 1, an inside and an outside of the through hole 31 are connected to each other by connecting portions 32 having a beam shape. A plurality of connecting portions 32 are formed, and the through hole 31 is divided into a plurality of parts by the plurality of connecting portions 32. A sound emission hole 84 is configured by the through hole 31 divided into the plurality of portions. The sound emission hole 84 opens a space inside the housing 1 to the atmosphere, and emits the sound generated by the sounding body 6 to the outside.

As shown in FIG. 2, a cylindrical portion 33 protruding toward the inside of the housing 1 is formed on the outer peripheral portion of the cover 3. The cylindrical portion 33 has a circular cylindrical shape. The cylindrical portion 33 is arranged so as to protrude into a space surrounded by the base cylindrical portion 21, the partition wall 22, and a side wall of the cover 3. In a space surrounded by the base cylindrical portion 21, the partition wall 22, and the side wall of the cover 3, an inner portion and an outer portion of the cylindrical portion 33 serve as resonance chambers 85 and 86, respectively.

The sound generated by the sounding body 6 passes through the sound passage 81, the sound pressure of the sound is amplified by the resonance chambers 82, 83, 85, 86, and is emitted to the outside of the housing 1 through the sound emission hole 84.

A connector 27 having a substantially rectangular cylindrical shape is formed outside the base cylindrical portion 21. The connector 27 is arranged on a lower surface of the base cylindrical portion 21 and opens in a downward direction of the housing 1.

The terminal 5 is arranged inside the connector 27. The terminal 5 electrically connects the substrate 7 with an external portion outside the housing 1. The terminal 5 penetrates the side wall of the base cylindrical portion 21, and a base in a portion of the terminal 5 exposed from an inner wall surface of the base cylindrical portion 21 is covered with an adhesive 91 and fixed to the base cylindrical portion 21.

A portion of the terminal 5 exposed from the inner wall surface of the base cylindrical portion 21 and the adhesive 91 protrudes toward the substrate 7. This protruding portion is referred to as a terminal protrusion 51. The substrate 7 is arranged at a portion closer to the case 4 than the base of the terminal protrusion 51 in a space formed by the base cylindrical portion 21, the partition wall 22, and the case 4, and the terminal protrusion 51 protrudes toward the case 4. The terminal 5 is connected to the substrate 7 by soldering at a tip of the terminal protrusion 51.

A portion of the terminal 5 between a portion penetrating the base cylindrical portion 21 and the terminal protrusion 51 has a curved shape. The bent portion is referred to as a terminal bent portion 52. The terminal bent portion 52 is exposed from the inner wall surface of the base cylindrical portion 21 and the adhesive 91.

The terminal 5 has an L shape by a linear portion passing through the base cylindrical portion 21, the terminal bent portion 52 curved vertically or substantially vertically, and the linear terminal protrusion 51. As shown in FIG. 1, six terminals 5 are arranged in the connector 27, and each of the six terminals 5 has the terminal protrusion 51 and the terminal bent portion 52 and is formed in an L-shape.

As shown in FIG. 2, the sounding body 6 includes the frame 61, a diaphragm 62, a drive unit 63, a lead wire 64, and a terminal metal 65.

The frame 61 supports the diaphragm 62 and the drive unit 63. The frame 61 has a substantially stepped cylindrical shape, and has a larger opening on a front than on a back of the frame 61. The opening on the front of the frame 61 is closed by the diaphragm 62. The sounding body 6 is fitted into the concave portion of the partition wall 22 at an opening end portion on a front surface of the frame 61, and is hermetically joined by adhesion. The frame 61 is made of resin.

The diaphragm 62 has an outer peripheral portion and an inner peripheral portion. The outer peripheral portion has a hollow truncated cone shape extending in the front direction. The inner peripheral portion has a dome shape protruding toward in the front direction. As described above, the shielding plate 24 has the same shape, and the inner peripheral portion and the outer peripheral portion of the shielding plate 24 face the inner peripheral portion and the outer peripheral portion of the diaphragm 62, respectively. The drive unit 63 is connected to a back surface of the diaphragm 62.

The drive unit 63 vibrates the diaphragm 62. The drive unit 63 includes a bobbin 631, a voice coil 632, and a magnetic circuit unit 633.

The bobbin 631 has a cylindrical shape and is joined to an outline of the inner peripheral portion of the diaphragm 62. The voice coil 632 is wound around the bobbin 631.

The magnetic circuit unit 633 applies a magnetic field to the voice coil 632. The magnetic circuit unit 633 includes a yoke, a magnet, and a top plate. The yoke has a bottomed cylindrical shape. The magnet has a disk shape, and is arranged on an inner bottom surface of the yoke. The top plate has a disk shape, and is laminated on the magnet. The yoke and the top plate are made of a magnetic material. The yoke opens toward the diaphragm 62 and is arranged so as to close the opening on the back surface of the frame 61.

A gap is formed between the magnet, the top plate, and a side wall of the yoke. The voice coil 632 is arranged in the gap. Thus, a magnetic field generated between the top plate and the side wall of the yoke is applied to the voice coil 632. By applying an electric current to the voice coil 632 in this state, the bobbin 631 moves in an axial direction, the diaphragm 62 vibrates, and a sound is generated.

The voice coil 632 is connected to the substrate 7 by the lead wire 64 and the terminal metal 65. One end of the lead wire 64 is connected to the voice coil 632, and the other end is connected to the terminal metal 65.

Figure 4:
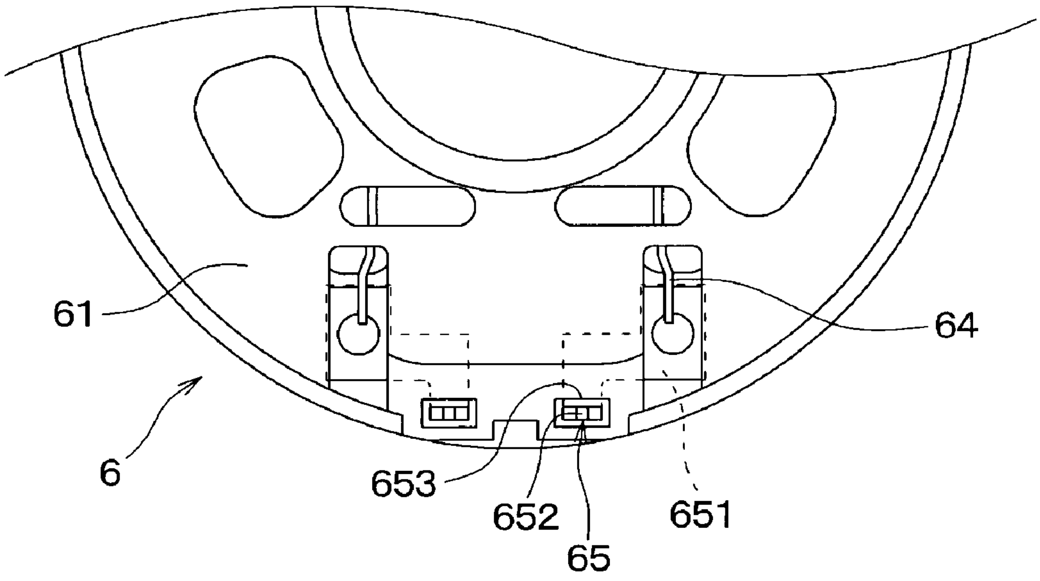
FIG. 4 is an enlarged view of a vicinity of a terminal metal of FIG. 3.
Figure 5:
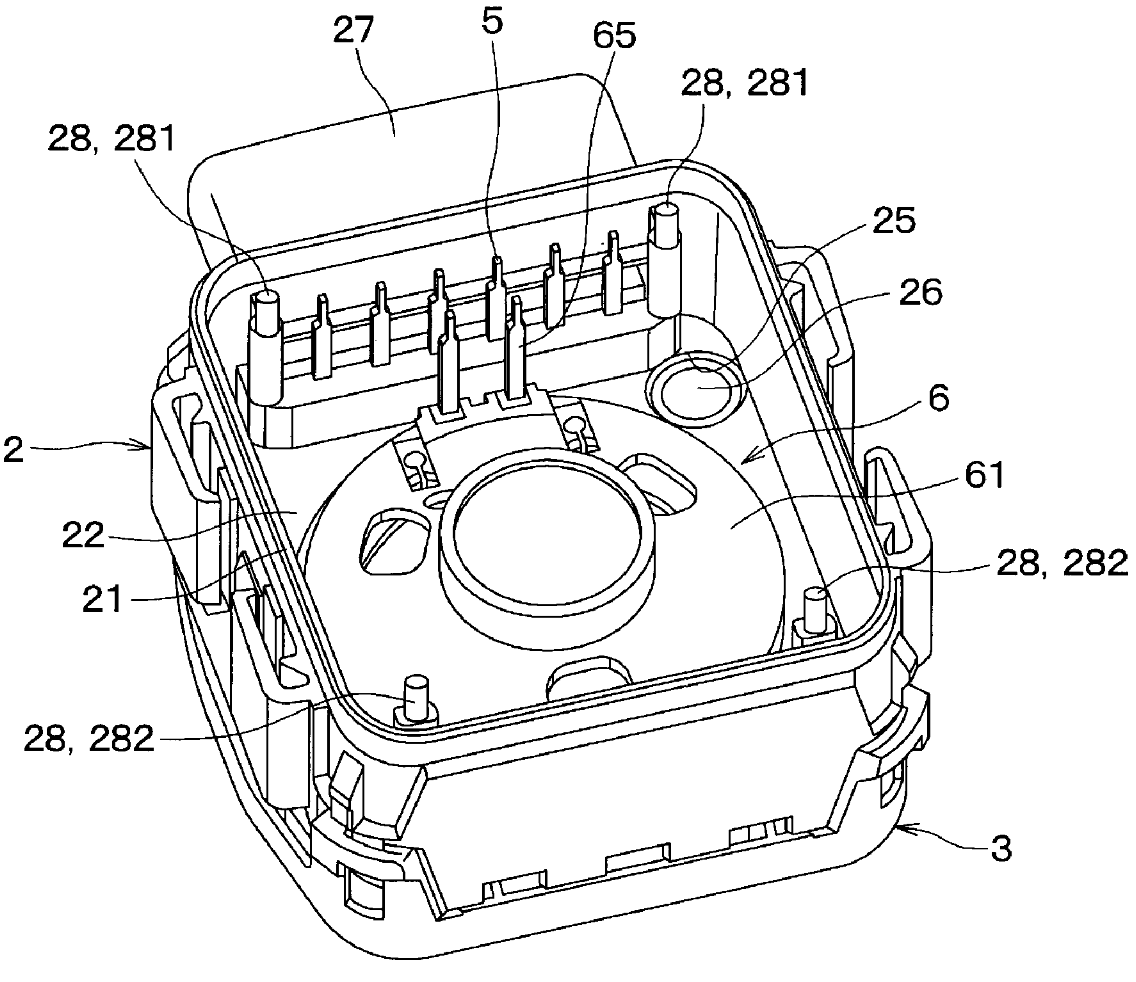
FIG. 5 is a perspective view of the sound generator as viewed from a back side before the substrate is attached.

The terminal metal 65 is integrally formed with the frame 61 by insert molding, and both ends of the terminal metal 65 is exposed to the back surface of the frame 61. As shown in FIGS. 4 and 5, one end of the terminal metal 65 is soldered to the lead wire 64, and the other end protrudes toward the substrate 7. An end portion soldered to the lead wire 64 is referred to as a terminal metal end 651, and a portion protruding toward the substrate 7 is referred to as a terminal metal protrusion 652. The terminal metal protrusion 652 is formed in a straight line. The terminal metal 65 is connected to the substrate 7 by solder at a tip of the terminal metal protrusion 652.

A length from a base of the terminal metal protrusion 652 to a connecting portion with the substrate 7 is longer than a length from the base of the terminal protrusion 51 to a connecting portion with the substrate 7.

As shown in FIG. 4, the terminal metal end 651 has a crank shape as viewed from a back side of the sounding body 6. The terminal metal end 651 is partially exposed from the frame 61, and is soldered to the lead wire 64 at the exposed portion.

As shown in FIGS. 2 and 4, the terminal metal 65 includes a terminal-metal bent portion 653 having a curved shape, and the terminal metal end 651 and the terminal metal protrusion 652 are connected by the terminal-metal bent portion 653. The terminal-metal bent portion 653 is covered with the frame 61.

The terminal-metal bent portion 653 sets a projecting direction of the terminal metal protrusion 652. More specifically, the terminal-metal bent portion 653 is provided to stand toward the substrate 7 at an end portion opposite to the terminal metal end 651, and thus has an L-shape as viewed from a lateral surface of the housing 1, and the terminal metal protrusion 652 protrudes toward the substrate 7.

As shown in FIGS. 3 to 5, the sounding body 6 includes two terminal metals Each of the two terminal metals 65 includes the terminal metal end 651, the terminal metal protrusion 652, and the terminal-metal bent portion 653.

As described above, the substrate 7 is arranged in a space on the back side of the sounding body 6, that is, the space defined by the base cylindrical portion 21, the partition wall 22, and the case 4. On the substrate 7, a circuit for driving the drive unit 63 by causing an electric current to flow through the voice coil 632 is formed by circuit components such as a resistor, a capacitor, and the like (not shown). The circuit components are arranged between the substrate 7 and the partition wall 22 and the frame 61.

A drive circuit on the substrate 7 is connected to the voice coil 632 by the lead wire 64 and the terminal metals 65. The drive circuit is connected to an ECU or the like of a vehicle by the terminal 5. When a signal is transmitted from the ECU or the like to the drive circuit via the terminal 5, an electric current flows through the voice coil 632 in response to the signal.

A through hole in which the terminal metal 65 and the terminal 5 pass is formed in the substrate 7. The terminal metal 65 and the terminal 5 are connected to the drive circuit on the substrate 7 by solder in the through hole.

The substrate 7 has a through hole in which a substrate attachment portion 28 formed in the base 2 passes. The substrate attachment portion 28 is a member for fixing the substrate 7 to the inside of the housing 1, and protrudes from the partition wall 22 toward the case 4 as shown in FIG. 2.

The substrate attachment portions 28 are arranged one at each of four corner portions of the base cylindrical portion 21. As shown in FIG. 5, the substrate attachment portion 28 has a tapered stepped columnar shape, and the substrate 7 is positioned in contact with a stepped portion by passing the substrate attachment portion 28 through the through hole of the substrate 7. Then, in a state where the substrate 7 is positioned, a tip of the substrate attachment portion 28 is melted and caulked by heat. Thus, the substrate 7 is fixed to the substrate attachment portion 28 as shown in FIG. 2.

As shown in FIGS. 3 and 5, the six terminals 5 line up along a lower side wall of the base cylindrical portion 21 between two of the four substrate attachment portions 28 arranged at a lower portion of the housing 1. The two terminal metals 65 are arranged along the six terminals 5 at a lower portion of the base cylindrical portion 21.

Among the four substrate attachment portions 28, the substrate attachment portion 28 on a lower side close to the terminal 5 and the terminal metal 65 is referred to as a substrate attachment portion 281. Further, the two substrate attachment portions 28 arranged at an upper corner portion farther from the connecting portion between the terminal 5 and the terminal metal 65 and the substrate 7 than the substrate attachment portion 281 are respectively referred to as substrate attachment portions 282. The substrate attachment portions 281 and 282 correspond to first and second substrate attachment portions, respectively.

The substrate attachment portion 282 has higher flexibility than the substrate attachment portion 281. More specifically, as shown in FIG. 3, the substrate attachment portion 281 is connected to the inner wall surface of the base cylindrical portion 21 by a plate-like connecting portion 283 protruding from the lateral surface of the substrate attachment portion 281, and the substrate attachment portion 281 and the base cylindrical portion 21 are integrally configured. On the other hand, since the substrate attachment portion 282 protrudes from the partition wall 22 in a state of being separated from the inner wall surface of the base cylindrical portion 21, the substrate attachment portion 282 is more easily deformed than the substrate attachment portion 281.

The effects of this embodiment is described. In the present embodiment, the terminal 5 protrudes from the inner wall surface of the housing 1 and is connected to the substrate 7 at an end portion of the terminal protrusion 51, so that a distance from a base of the terminal 5 to the connecting portion with the substrate 7 is increased. Thus, the terminal 5 is flexibly deformed following a temperature change, and stress applied to the connecting portion between the terminal 5 and the substrate 7 is reduced. Therefore, the terminal 5 and the substrate 7 are connected to each other without using a wire or the like while reducing manufacturing cost. Thus, an occurrence of malfunction can be reduced and a product life can be extended.

Further, according to the embodiments described above, it is possible to achieve the following advantageous effects.

(1) The terminal 5 includes the terminal bent portion 52 between a portion of the base 2 which penetrates the base cylindrical portion 21, which is included the housing 1, and the terminal protrusion 51 and the terminal bent portion 52 is exposed from the inner wall surface of the base cylindrical portion 21. According to this, since the terminal 5 is more flexibly deformed by the terminal bent portion 52, the stress applied to the connecting portion between the terminal 5 and the substrate 7 can be further reduced.

(2) The terminal metal 65 that electrically connects the drive unit 63 and the substrate 7 includes the terminal metal protrusion 652. The terminal metal protrusion 652 is exposed from the frame 61, which supports the drive unit 63, and protrudes toward the substrate 7. The terminal metal 65 is connected to the substrate 7 at an end portion of the terminal metal protrusion 652, and the terminal metal protrusion 652 is longer than the terminal protrusion 51.

As described above, the terminal metal 65 protrudes from the frame 61 and is connected to the substrate 7 at the end portion of the terminal metal protrusion 652, so that a distance from a base of the terminal metal 65 to the connecting portion with the substrate 7 is increased. As a result, the terminal metal 65 is flexibly deformed following the temperature change, the stress applied to the connecting portion between the terminal metal 65 and the substrate 7 can be reduced, and an occurrence of cracks or the like in a soldered portion connecting the terminal metal 65 and the substrate 7 can be reduced.

(3) The terminal metal 65 includes the terminal-metal bent portion 653 having a curved shape between the terminal metal end 651 and the terminal metal protrusion 652, and the terminal metal protrusion 652 protrudes toward the substrate 7 by the terminal-metal bent portion 653. Thus, the tip of the terminal metal protrusion 652 can be connected to the substrate 7.

(4) The substrate 7 is fixed inside the base 2 constituting the housing 1 by the substrate attachment portion 281 and the substrate attachment portion 282. The substrate attachment portion 282 is arranged at a position farther from a connecting portion between the terminal 5 and the substrate 7 than the substrate attachment portion 281. The substrate attachment portion 281 is connected to the inner wall surface of the base cylindrical portion 21, and the substrate attachment portion 282 is separated from the inner wall surface of the base cylindrical portion 21. Accordingly, flexibility of the substrate attachment portion 282 is higher than that of the substrate attachment portion 281.

As described above, by making the flexibility of the substrate attachment portion 282 far from the connecting portion between the terminal 5 and the substrate 7 higher than that of the substrate attachment portion 281, when the base 2 is deformed due to the temperature change, the substrate attachment portion 282 is greatly deformed, and thus the deformation of the substrate attachment portion 281 can be reduced. Therefore, the stress applied to the connecting portion between the terminal 5 and the substrate 7 can be further reduced.

(5) A substrate 7 is arranged inside the housing 1. Accordingly, an entire apparatus can be downsized as compared with a case where the substrate 7 is arranged outside the housing 1.

(6) Circuit components such as a resistor and a capacitor on the substrate 7 are arranged in a space between the substrate 7 and the partition wall 22 and the frame 61. According to this, by arranging the circuit components in a gap defined by a shape of the frame 61, the sound generator can be further downsized.

Second Embodiment

A second embodiment will be described. The second embodiment is different from the first embodiment in shapes of the terminal metal 65. Other portions are similar to those of the first embodiment, and thus portions different from the first embodiment will be mainly described.

Figure 6:
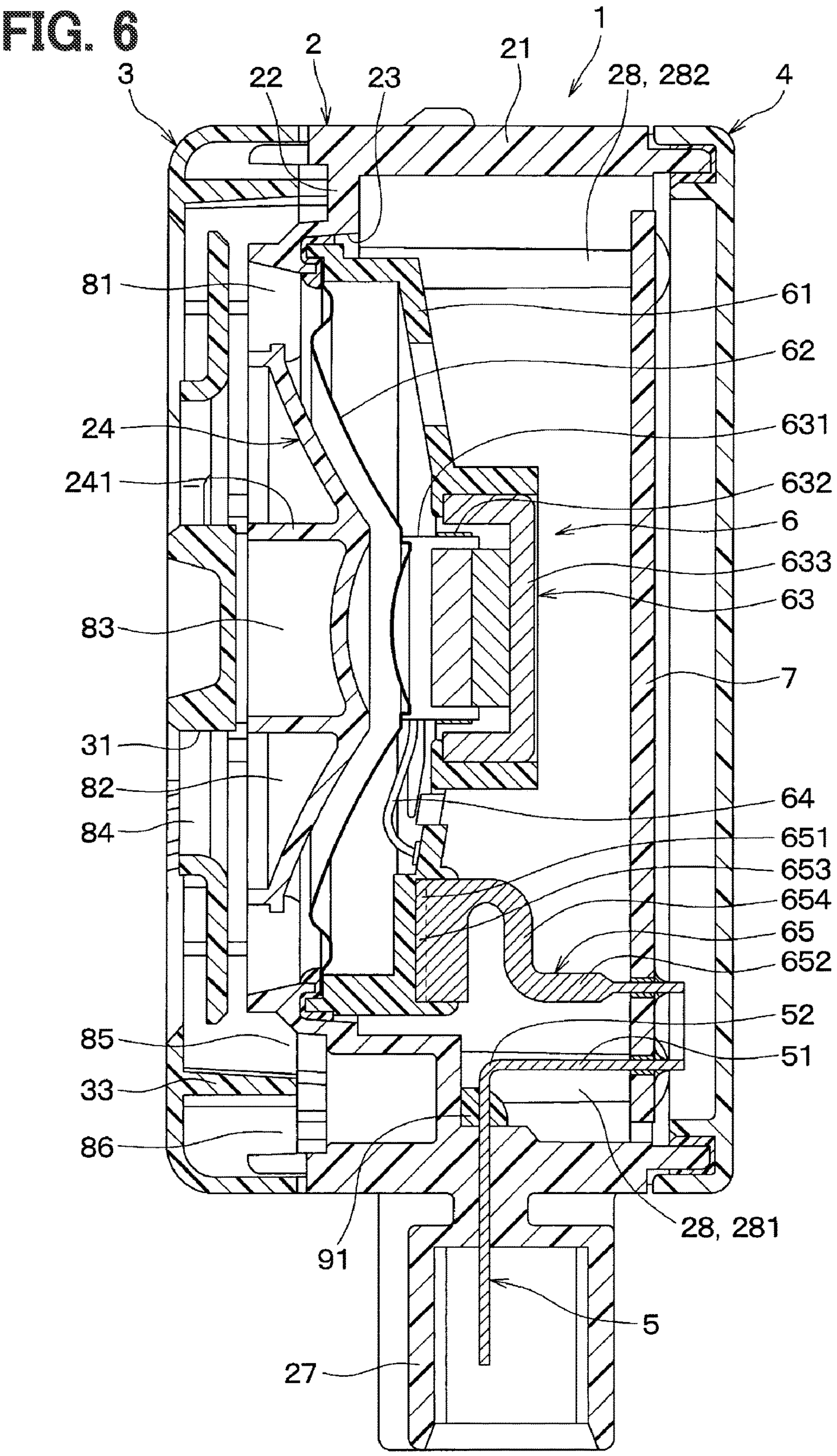
FIG. 6 is a cross-sectional view of a sound generator according to a second embodiment.

As shown in FIG. 6, in the present embodiment, a terminal metal 65 includes a terminal-metal curved portion 654 having a curved shape between a terminal metal protrusion 652 and a terminal-metal bent portion 653. The terminal-metal curved portion 654 is bent vertically or substantially vertically at two positions, and thus the terminal metal 65 has a crank shape as viewed from the lateral surface of the housing 1. In FIG. 6, the terminal metal end 651 is indicated by a broken line. In the present embodiment, the terminal-metal bent portion 653 has an L shape as viewed from an up-down direction of the housing 1.

In the present embodiment, it is possible to achieve the advantageous effects as similar to the effects in the first embodiment with the configuration and operation identical to the ones in the first embodiment.

Further, according to the embodiments described above, it is possible to achieve the following advantageous effects.

(1) The terminal metal 65 includes the terminal-metal curved portion 654 having a curved shape between the terminal-metal bent portion 653 and the terminal metal protrusion 652. In this way, by forming a portion of the terminal metal 65 exposed from the frame 61 into a curved shape, the terminal metal 65 is more flexibly deformed, and thus the stress applied to the connecting portion between the terminal metal 65 and the substrate 7 can be further reduced. Further, a position of the connecting portion between the terminal metal protrusion 652 and the substrate 7 can be set regardless of a position of the terminal-metal bent portion 653.

Third Embodiment

A third embodiment will be described. The third embodiment is different from the second embodiment in a connection method between the terminal 5 and the terminal metal 65. Other portions are similar to those of the first embodiment, and thus portions different from the first embodiment will be mainly described.

Figure 7:
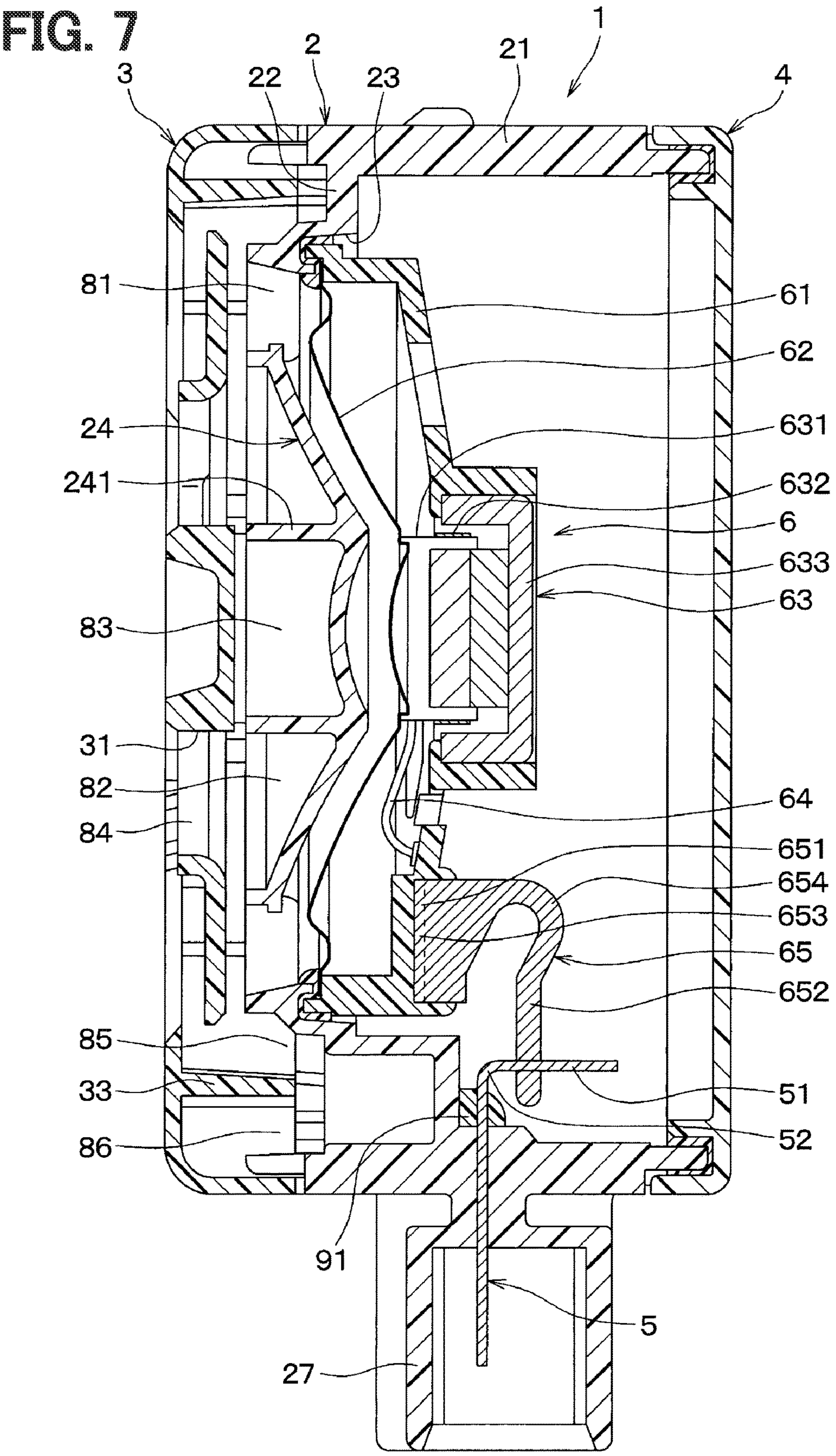
FIG. 7 is a cross-sectional view of a sound generator according to a third embodiment.

As shown in FIG. 7, in the present embodiment, the substrate 7 is not arranged inside the housing 1, the terminal 5 and the terminal metal 65 are directly connected to each other, and the terminal 5 electrically connects the terminal metal 65 and the outside of the housing 1.

More specifically, the terminal-metal curved portion 654 is bent substantially vertically, and the terminal metal protrusion 652 protrudes toward the terminal 5. A slit (not shown) is formed in the terminal 5, and the terminal 5 and the terminal metal 65 are electrically connected to each other by press-fitting a tip portion of the terminal metal protrusion 652 into the slit. In the present embodiment, the number of terminals 5 is 2 corresponding to the number of terminal metals 65.

As described above, the terminal metal 65 protrudes toward the terminal 5 and is connected to the terminal 5 at a protruding portion, so that a distance from the base of the terminal metal 65 to the connecting portion with the terminal 5 is increased. Therefore, the terminal metal 65 is flexibly deformed following a temperature change. In addition, by forming the terminal metal 65 into a bent shape, the terminal metal 65 is more flexibly deformed. Thus, stress applied to the connecting portion between the terminal 5 and the terminal metal 65 can be reduced. Therefore, the terminal 5 and the terminal metal 65 are connected to each other without using a wire or the like while reducing manufacturing cost. Thus, an occurrence of malfunction can be reduced.

Other Embodiments

The present disclosure is not limited to the above-described embodiments, and can be appropriately modified. Individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. In each of the above embodiments, when the shape, positional relationship, and the like of the constituent elements and the like are referred to, the shape, the positional relationship, and the like are not limited unless otherwise specified or limited to specific shapes, positional relationships, and the like in principle.

For example, although the sound generator has been described in each of the above embodiments, the present disclosure may be applied to an electrical device other than the sound generator.

In the second embodiment, the terminal metal 65 has a crank shape, but may have another shape. For example, a terminal metal 65 may be formed into an S-shape by forming a terminal-metal bent portion 653 into a U-shape at 2 positions.

While the present disclosure has been described with reference to examples, it is understood that the present disclosure is not limited to the disclosed examples and structures described above. Rather, the present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. An electrical device comprising:

a housing;

a drive unit arranged inside the housing;

a substrate arranged inside the housing and on which a circuit configured to drive the drive unit is formed; and a terminal electrically connecting the substrate with an external portion outside the housing, wherein the terminal includes a terminal protrusion exposed from an inner wall surface of the housing and protruding toward the substrate, and is connected to the substrate at an end portion of the terminal protrusion, the substrate is fixed inside the housing by a first substrate attachment portion and a second substrate attachment portion arranged at a position farther from a connecting portion between the terminal and the substrate than the first substrate attachment portion, and the second substrate attachment portion has higher flexibility than the first substrate attachment portion.

2. The electrical device according to claim 1, wherein the terminal includes a terminal bent portion between a portion penetrating the housing and the terminal protrusion, and the terminal bent portion is exposed from the inner wall surface of the housing.

3. The electrical device according to claim 1, further comprising a terminal metal electrically connecting the drive unit and the substrate, wherein the drive unit is supported by a frame, the terminal metal includes a terminal metal protrusion exposed from the frame, the terminal metal protrusion protrudes toward the substrate, the substrate is connected to an end portion of the terminal metal protrusion, and the terminal metal protrusion is longer than the terminal protrusion.

4. The electrical device according to claim 3, wherein the terminal metal includes a terminal-metal bent portion between an end portion connected to the drive unit and the terminal metal protrusion, and the terminal metal protrusion protrudes toward the substrate from the terminal-metal bent portion.

5. The electrical device according to claim 4, wherein the terminal metal includes a terminal-metal curved portion having a curved shape between the terminal-metal bent portion and the terminal metal protrusion.

6. The electrical device according to claim 1, wherein the first substrate attachment portion protrudes from a partition wall inside the housing, and the first substrate attachment portion is connected to an inner wall surface of the housing via a connecter protruding from a lateral surface of the first substrate attachment portion.

7. The electrical device according to claim 1, wherein the second substrate attachment portion protrudes from a partition wall inside the housing, and a lateral surface of the second substrate attachment portion is separated from an inner wall surface of the housing.

* * * * *